US008472982B1

(12) United States Patent
Oroskar et al.

(10) Patent No.: US 8,472,982 B1
(45) Date of Patent: Jun. 25, 2013

(54) RAPID PAGING BASED ON DEVICE MOBILITY AND COVERAGE AREA MOBILITY

(75) Inventors: Siddharth S. Oroskar, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 209 days.

(21) Appl. No.: 13/108,654

(22) Filed: May 16, 2011

(51) Int. Cl.
*H04W 68/00* (2009.01)

(52) U.S. Cl.
USPC ........ 455/458; 455/435.1; 455/515; 370/241; 370/311; 370/328

(58) Field of Classification Search
USPC ............... 455/435.1, 458, 515; 370/241, 311, 370/328
See application file for complete search history.

(56) References Cited

U.S. PATENT DOCUMENTS

| 6,393,285 | B1 * | 5/2002 | Stephens ................ 455/435.1 |
| 6,922,561 | B2 * | 7/2005 | Chen et al. ............. 455/435.1 |
| 8,280,401 | B2 * | 10/2012 | Na et al. ................ 455/456.1 |
| 2004/0176113 | A1 * | 9/2004 | Chen et al. ............. 455/458 |
| 2004/0198353 | A1 * | 10/2004 | Quick, Jr. .............. 455/435.1 |
| 2006/0068813 | A1 * | 3/2006 | Ku et al. ................ 455/458 |
| 2008/0293437 | A1 * | 11/2008 | Ranganathan et al. ....... 455/458 |

* cited by examiner

*Primary Examiner* — Olumide T Ajibade Akonai

(57) ABSTRACT

Disclosed herein are exemplary methods and systems that may help determine when to make a rapid page attempt in a certain coverage area, before resorting to zone-based paging. An exemplary method involves: (a) at a radio access network, determining that a wireless communication device (WCD) should be paged; (b) responsive to determining that the WCD should be paged: (i) determining a last-known coverage area of the WCD, (ii) based at least in part on a WCD mobility indicator of the WCD and a coverage-area mobility indicator of the last-known coverage area, determining an overall mobility indicator, and (iii) using the overall mobility indicator as a basis for determining whether or not to make a rapid page attempt to the WCD; (c) if it is determined to make the rapid page attempt, then making the rapid page attempt in the last-known sector; and (d) otherwise, using a zone-based paging scheme to page the WCD.

20 Claims, 5 Drawing Sheets

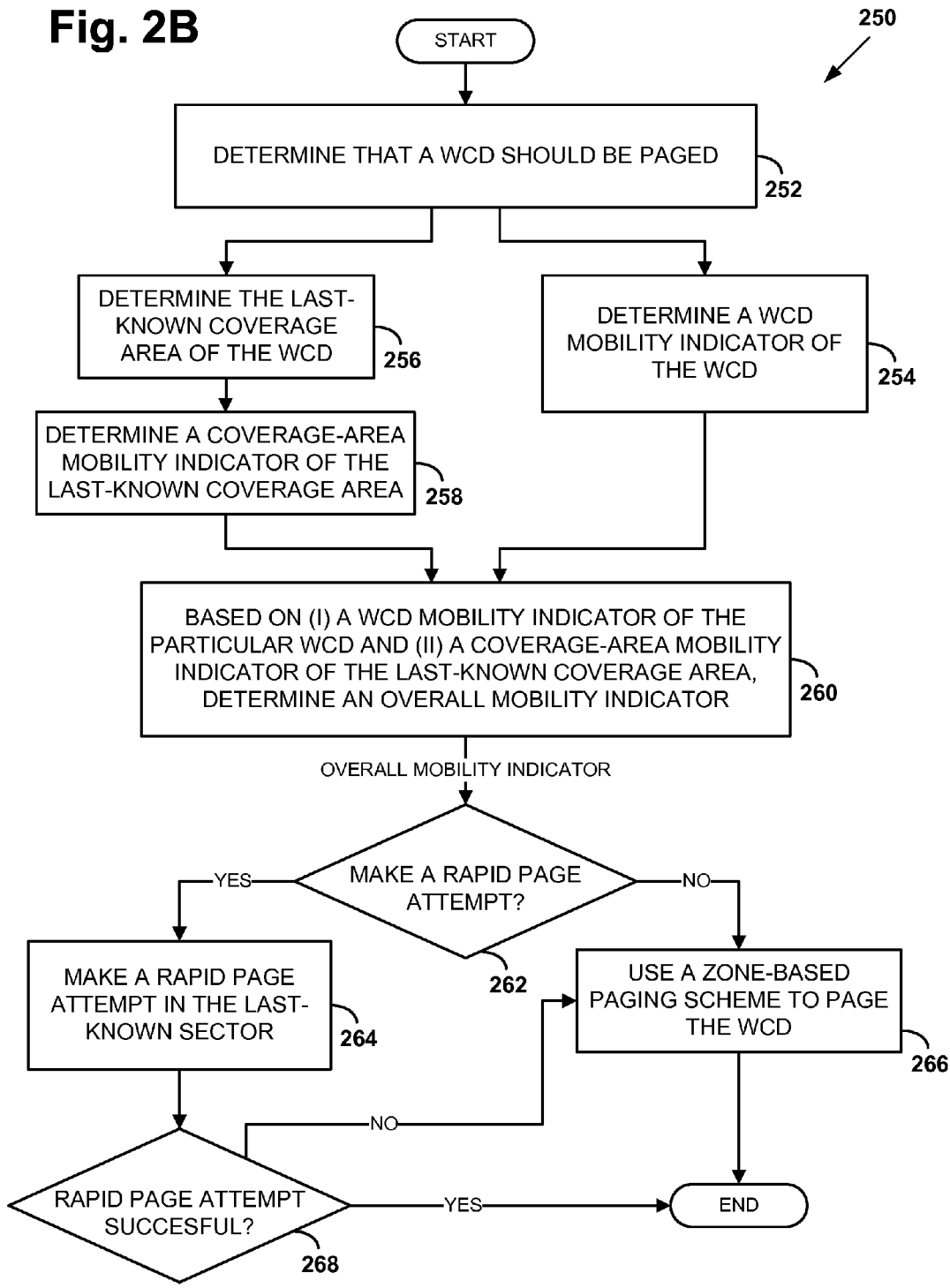

RAPID PAGING BASED ON DEVICE MOBILITY AND COVERAGE AREA MOBILITY

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet.

When a wireless communication device, such as a cellular telephone, pager, or wirelessly-equipped computer, is positioned in a cell, the wireless communication device communicates via an RF air interface with the base station antennae of a cell. Consequently, a communication path can be established between the wireless communication device and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by wireless communication devices in the coverage areas and orchestrating handoff of calls between coverage areas. And the switch and/or gateway, in turn, may control one or more base station controllers and generally control wireless communications, by performing functions such as receiving and processing call requests, instructing base station controllers when to assign traffic channels, paging wireless communication devices, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may have a limited number of traffic channels that its serving base station can assign at any given time (e.g., for concurrent use by numerous wireless communication devices, or for other use). In CDMA, for instance, each traffic channel may be defined by encoding with a particular "Walsh code," yet the sector may have a limited pool of such Walsh codes. Alternatively, in time division multiplex systems, such as TDMA or 1xEV-DO (e.g., the 1xEV-DO forward link for instance), traffic channels may be defined through interleaved timeslots on the air interface.

Furthermore, each sector may define an air interface "paging channel" on which the serving base station can send access probe acknowledgements and traffic channel assignment messages to served wireless communication devices. The paging channel may have limited capacity. (Further, if multiple access channels are provided, they may cooperatively have limited capacity.) For instance, the paging channel may define timeslots in which the base station can send various messages to particular wireless communication devices. If the base station has numerous such messages to send, however, the paging channel can become congested and can thereby delay call setup or the like.

When a switch in a cellular wireless communication system seeks to page a wireless communication device (e.g., for an incoming call or for some other reason), the switch can send the page message to numerous base stations in the switch's coverage area, with the hope that when the base stations broadcast the page message, the wireless communication device will receive the page message in one of the associated sectors and will respond. Given the scarcity of paging channel resources, however, most modern cellular networks are instead arranged to engage in a more targeted paging process known as "zone based paging."

With zone based paging, a cellular network is divided into paging zones, each with a respective zone ID, and paging is performed on a zone-basis. To facilitate this, each base station in the system may broadcast as one of its overhead parameters the zone ID for the zone in which the base station is located. Wireless communication devices operating in the network may then programmatically monitor the zone IDs indicated in the overhead messages and may automatically register with the network when they detect that they have moved into a new zone, or for other reasons. To register with the network, a wireless communication device may send a registration message via the access channel in its current sector, and a switch in the network would note the wireless communication device's registration and convey an indication of the registration to a home location register for later reference.

With this process, the registration records thereby maintained by switches and/or home location registers will indicate the paging zone in which each wireless communication device last registered. When a switch seeks to page a wireless communication device, the switch may then efficiently send the page message to just those base stations that are within the zone of the wireless communication device's last registration, as it is likely that the wireless communication device is in that zone. Further, the switch may send the page message to the base stations in zones adjacent to the wireless communication device's zone of last registration, to cover the possibility that the wireless communication device has moved to a new zone but has not yet registered its presence in the new zone. Once the designated base stations transmit the page message, if the wireless communication device does not respond to the page, the switch may then broaden the scope of the page, by sending the page message to a wider range of paging zones and perhaps ultimately to all base stations in the switch's serving area.

OVERVIEW

When zone-based paging is implemented, a page may be initially sent in all sectors of the zone in which a wireless communication device (WCD) last registered. Even if the first attempt to page the WCD succeeds and the WCD receives the page in a sector within this zone, network resources are used to page the WCD in other sectors in the zone. Since the page is not received by the WCD in the other sectors in the zone, the network resources used in these sectors could likely be put to a more beneficial use.

Exemplary methods may therefore involve a "rapid page," which is a more-targeted page that is sent in a specific sector where the mobile is believed to be located. When successful, a rapid page may help to free up paging-channel resources in other sectors within the zone where the mobile's last call ended. However, when a rapid page is unsuccessful and subsequent zone-based paging is initiated, then the rapid page may delay the page reaching the mobile and may actually increase the amount of paging-channel resources used as compared to if zone-based paging were initiated immediately.

Accordingly, exemplary embodiments involve determining when it is appropriate to send a more-targeted page, which may be referred to as a "rapid page," in a certain sector where the mobile is believed to be located, before initiating zone-based paging. In particular, exemplary embodiments consider the mobility of a WCD when determining whether to make a rapid page attempt, as the less mobile a given WCD is, the less likely the WCD is to have moved from a coverage area where it last registered.

Further, the mobility characteristics of coverage areas may vary from coverage area to coverage area. For instance, WCDs may be significantly less mobile, on average, in a coverage area encompassing a residential area, than in a coverage area encompassing a highway. Accordingly, when determining whether to make a rapid page attempt, exemplary embodiments further consider the mobility of the coverage area where a WCD's presence was last detected.

In one aspect, an exemplary method may involve: (a) at a radio access network, determining that a WCD should be paged; (b) responsive to determining that the WCD should be paged: (i) determining a last-known coverage area of the WCD, (ii) based at least in part on a WCD mobility indicator of the WCD and a coverage-area mobility indicator of the last-known coverage area, determining an overall mobility indicator, and (iii) using the overall mobility indicator as a basis for determining whether or not to make a rapid page attempt to the WCD; (c) if it is determined to make the rapid page attempt, then making the rapid page attempt in the last-known sector; and (d) otherwise, using a zone-based paging scheme to page the WCD.

In another aspect, an exemplary method may involve: (a) at a radio access network, determining that a WCD should be paged; (b) responsive to determining that the WCD should be paged: (i) determining a last-known coverage area of the WCD, (ii) based at least in part on a WCD mobility indicator of the WCD and a coverage-area mobility indicator of the last-known coverage area, determining an overall mobility indicator; and, (iii) based at least in part on the overall mobility indicator and an elapsed time since a last call of a WCD ended, determining whether or not to make a rapid page attempt to the WCD; (c) if it is determined to make the rapid page attempt, then making the rapid page attempt in the last-known sector; and (d) otherwise, using a zone-based paging scheme to page the WCD.

In yet another aspect, an exemplary radio-access-network system may include a non-transitory computer-readable medium and program instructions stored in the non-transitory computer-readable medium and executable by at least one processor to: (a) determine that a radio access network should page a wireless communication device (WCD); (b) determine a last-known coverage area of the WCD; (c) based at least in part on (i) a WCD mobility indicator of the WCD and (ii) a coverage-area mobility indicator of the last-known coverage area, determine an overall mobility indicator; (d) use the overall mobility indicator as a basis for determining whether or not to make a rapid page attempt to the WCD; (e) if it is determined to make the rapid page attempt, then initiate the rapid page attempt in the last-known sector; and (f) otherwise, cause a zone-based paging scheme to implemented in order to page the WCD.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 2B is another flow chart illustrating a method according to an exemplary embodiment;

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
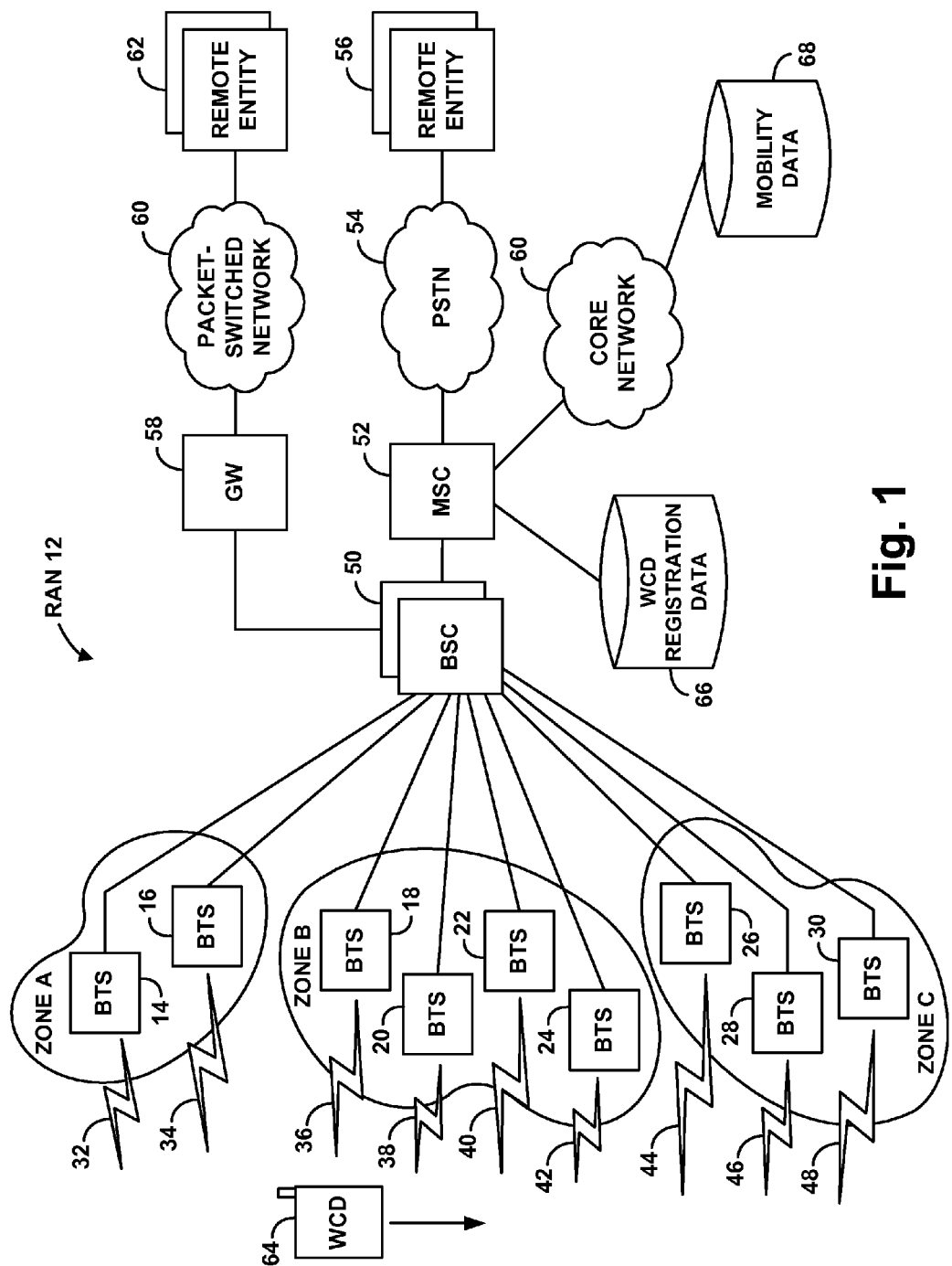
FIG. 1 is a simplified block diagram of a communications network in which an exemplary embodiment may be implemented.

Referring to the drawings, FIG. 1 is a simplified block diagram of a communications network in which the present method can be implemented. As shown, the exemplary network includes at its core a radio access network (RAN) 12 that radiates to define numerous coverage areas in which wireless communication devices (WCDs) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

FIG. 1 depicts a representative WCD 64 by way of example, which could be a cell phone, wirelessly equipped personal digital assistant (PDA), or any other type of wirelessly-equipped device now known or later developed. The WCD is preferably equipped with hardware, software, and/or other logic to communicate with RAN 12 in accordance with an agreed communication protocol, such as one of the protocols noted above for instance.

As shown, the RAN may include numerous base stations (also known as base transceiver stations or BTSs), designated in the figure as base stations 14-30 and one or more base station controllers (BSCs) 50 (which may be integrated with one or more of the base stations). The base stations preferably include directional antennas, power amplifiers, and associated transceiver equipment arranged to establish corresponding wireless coverage areas 32-48 as shown and to communicate with WCDs in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance. For simplicity, the term "sector" should be understood herein to encompass the smallest type of coverage area in a given RAN, and thus may refer to a cell in a RAN where cells are not subdivided into sectors, or to a cell sector in a RAN where cells are divided as such, or to a coverage area defined in some other manner.

As shown, each base station controller may be coupled with a mobile switching center (MSC) 52 or another type of switch that provides connectivity with the public switched telephone network (PSTN) 54 if applicable, so that served WCDs can communicate with remote entities 56 on the PTSN. And each base station controller may be coupled with a packet data serving node (PDSN) or other gateway 58 that provides connectivity with a packet-switched network 60 if applicable, so that served WCDs can communicate with remote entities 62 on the packet-switched network.

An exemplary WCD 64 is typically configured to scan for pilot signals from nearby coverage areas. When a number of pilot signals are detected, the WCD typically selects the coverage area having the strongest pilot signal (or at least having a sufficient pilot-signal strength), and registers with the serving radio access network (RAN) for that coverage area so that the RAN has a record of where the WCD is located. Subsequently, when the device then seeks to initiate a communication session or the RAN seeks to connect a communication to the device, the RAN may assign a traffic channel or traffic channel resource (e.g., timeslots) in the coverage area for use by the device to engage in the communication.

During the course of a communication session, the subscriber device may then continue to monitor the pilot signal of its serving coverage area and the pilot signals of other coverage areas in its vicinity. If the device or the RAN detect that a pilot signal from another coverage area is stronger by more than a threshold amount, the device may then work with the RAN to orchestrate a handoff of the communication session from the current coverage area to the other coverage area, if possible.

It should be understood that the RAN arrangements shown in FIG. 1 are merely examples, and that numerous other arrangements are possible as well. By way of example, various RAN components could be combined together, distributed, substituted, added, omitted, or provided under other names. For instance, a radio network controller (RNC) could be provided in place of a BSC. Further, a representative BTS, alone or in combination with a BSC or RNC, could be a macro network base station comprising a typical public cell tower for instance, or could be a femtocell operated in a home or office and coupled through a broadband network with other components of the RAN. RANs can also differ in structure and function from each other.

In FIG. 1, the base stations 14-30 are grouped into zones A, B, and C, to facilitate zone-based paging as described above. As such, each base station 14-30 may broadcast a zone ID indicating its zone, and a WCD such as WCD 64 may monitor the zone IDs broadcast in the coverage areas where the WCD is operating. When the WCD detects a change in zone ID, the WCD may then responsively register its presence in the new zone, so that the RAN would then know to page the WCD in that new zone.

To facilitate zone-based paging, MSC 52 may include or have access to WCD registration data 66 and coverage area data 68. The WCD registration data 66 preferably comprises data that specifies per WCD where the WCD is currently registered, such as the zone in which the WCD is currently registered, among possibly other information. The WCD registration data 66 can take the form of a visitor location register (VLR) database, which holds a record per WCD in the MSC's service area. The WCD's current zone of registration may accordingly be indicated by the WCD's VLR record. Alternatively or additionally, the WCD registration data can take the form of a home location register (HLR) database that is accessible by the MSC. Still alternatively, the data may be stored internally at the MSC or elsewhere in some other form.

In a further aspect, MSC 52 may track subscriber usage for any number of reasons, such as to facilitate billing and performance monitoring. To do so, for each call that the MSC 52 handles, MSC 52 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 52 may transmit these CDRs to a central entity that maintains a database in which the CDRs are compiled. It should be understood that RAN components other than MSCs may generate CDRs in addition to or instead of MSC 52 generating CDRs.

In an exemplary embodiment, CDRs may indicate the time at which a given call ended, and for each WCD involved in the call, the location or locations of the WCD during the call (e.g., the sector(s) and/or zone(s) in which the WCD was located throughout the call). As such, an MSC 52 may use CDRs (e.g., by accessing a service-provider-maintained database compiling data from CDRs) to determine, for example, the sector in which a WCD was located when the WCD ended its last call. In addition, MSC 52 may determine, based on the time that the last call ended, the period of time that has elapsed since the end of the last call.

In a further aspect, the MSCs, base stations, and/or other components of a RAN 12 may coordinate to track mobility data for the various WCDs served by the RAN. In particular, a RAN 12 may be configured to access a mobility database 68 via a service provider's core network 60. It should be understood that the location of mobility database may vary. For example, it may be accessed via packet-switched network 60, or be stored at a RAN entity, such as at an MSC or at an HLR. Other variations on the illustrated arrangement are possible as well.

Further, the RAN 12 may populate mobility database 68 with various types of mobility data. For instance, whenever a base station hands off from one coverage area to another (e.g., from one sector to another sector, which may be served by the same or by a different base station), data in mobility database 68 may be updated to reflect the occurrence of the handoff. Additionally or alternatively, the RAN may populate mobility database 68 with data reflecting mobile-station speed. In either scenario, the RAN may index the data according to the coverage area or areas where the data was acquired (e.g., the coverage that was handed off from or where mobile-station speed was measured).

Figure 2A:
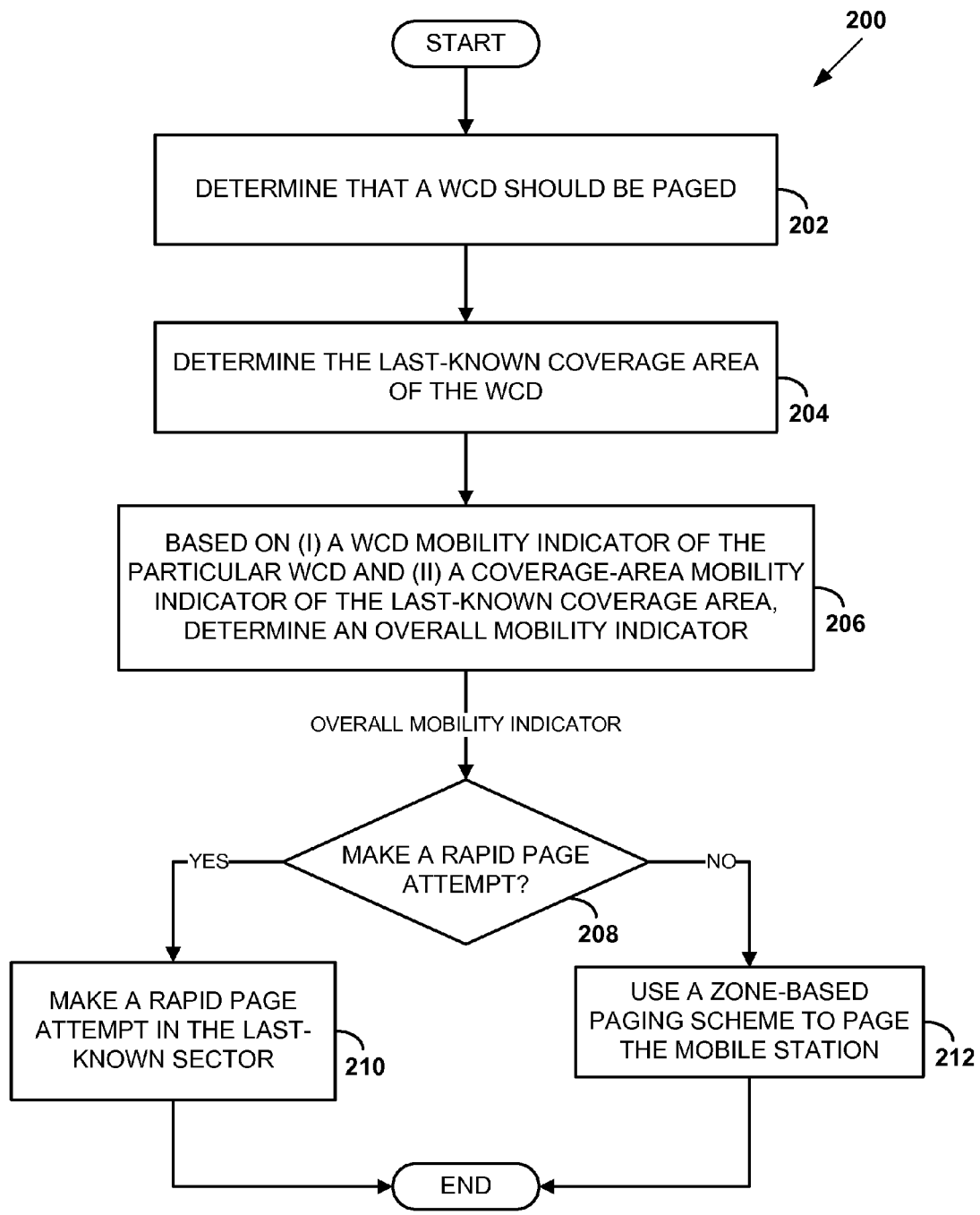
FIG. 2A is a flow chart illustrating a method according to an exemplary embodiment.

FIG. 2A is a flow chart illustrating a method according to an exemplary embodiment. Method 200 and other exemplary methods may be described by way of example herein as generally being carried out by a RAN. As such, exemplary methods may be carried out by a RAN component or a combination of RAN components. For instance, method 400 may be carried out by a base station (e.g., a BTS and/or a BSC), by an MSC, or by the combination of one or more of these RAN components and/or other RAN components.

As illustrated in FIG. 2A, method 200 involves a RAN determining that a WCD should be paged, as shown in block 202. When the RAN determines that the WCD should be paged, the RAN responsively determines the last-known coverage area of the WCD, as shown by block 204. Then, based on (i) a WCD mobility indicator of the particular WCD and (ii) a coverage-area mobility indicator of the last-known coverage area, the RAN determines an overall mobility indicator, as shown by block 206. This overall mobility indicator may then be used as a basis for determining whether or not to make a rapid page attempt to the WCD, as shown by block 208. If the RAN determines that it should make a rapid page attempt, then it makes the rapid page attempt in the last-known sector, as shown by block 210. Otherwise, the RAN proceeds to use a zone-based paging scheme in order to page the WCD, as shown by block 212.

In some embodiments, the last-known coverage area may be the sector of the RAN in which a last call of the WCD ended. In such an embodiment, the BSC, MSC, and/or another RAN component or components may first retrieve, look up, and/or use CDRs for the WCD in order to determine the sector in which the WCD's last call ended. This data may be maintained in MSCs or elsewhere.

In other embodiments, the last-known coverage area may be a coverage area of the radio access network in which the WCD last registered. For instance, this coverage area may be the zone in which the WCD last registered, or the sector in which the WCD last registered. In an embodiment where the RAN determines the sector in which the WCD last registered, the MSC and/or the BSC may do so by querying an HLR for the zone in which the WCD is currently registered.

In an embodiment where the RAN determines the zone of last registration, the MSC may look up the zone in which the WCD last registered. The MSC may then determine a sector mobility indicator for each sector in this zone, and use all of these sector mobility indicators to determine the coverage area mobility indicator for the zone. For example, the MSC may determine the coverage area mobility indicator by averaging the sector mobility indicators for the sectors in the zone. Other techniques may also be used to determine the coverage area mobility indicator for a given zone.

In exemplary embodiments, the WCD mobility indicator may take on various forms. For example, the mobility indicator for a given WCD may indicate how often the given WCD hands off. The WCD mobility indicator may be, for example, the rate at which a WCD is handed off over a predetermined period of time (e.g., the total number of handoffs during the predetermined period divided by the predetermined period). Alternatively, the WCD mobility indicator may be the rate at which the given WCD hands off when located in a given sector. More specifically, this rate may be equal to are derived from the number of handoffs of the given WCD from a particular sector, divided by the total time spent by the given WCD in the particular sector.

In some embodiments, the WCD mobility indicator may be or may take into account a rate-of-movement indicator of the WCD. For instance, the rate-of-movement indicator may be a speed at which the WCD is currently moving, or may be an average speed for the WCD over a period of time. In either case, the speed may be estimated by the WCD and/or by the RAN based on the WCD's location over time (e.g., by determining the distance traveled over a certain period of time). Additionally or alternatively, the WCD may determine its speed using GPS and/or various sensors such as accelerometers, gyroscopes, and/or compasses, and report its speed or other such rate-of-movement data to the RAN. Furthermore, a WCD and/or a RAN may record a WCD's average speed on a sector-by-sector basis so that an average speed for the WCD may available for each individual sector the WCD operates in. A WCD and/or a RAN also may record a WCD's average speed across all sectors that a WCD operates in, or for certain subsets of the sectors that a WCD operates in (e.g., such as zone-by-zone tracking of average WCD speed). A WCD mobility indicator may take a form that differs from those that are specifically described herein, without departing from the scope of the invention.

In other embodiments, the WCD mobility indicator may take the form of the average duration that the WCD stays in a sector before handing off to another sector (e.g., the average time between when the WCD registers in a given sector and when the WCD hands off from the given sector to another sector). The average duration may be determined by averaging measured durations across all sectors that a given WCD operates in, by averaging measured durations across a subset of the sectors that a given WCD operates in, or by averaging measured durations for a given WCD on a sector-by-sector basis.

As a specific example, when a WCD wants to add a given sector to its active set, it may notify the serving BTS, which in turn may acknowledge that the WCD can add the sector. In an exemplary embodiment, the time when a WCD adds a sector to its active set may be considered to be the time when the WCD "enters" the sector. Similarly, the time when a mobile station drops the sector from its active set may be considered the time when the WCD "exits" the sector. Therefore, the duration that the WCD stays in a sector may be determined as the time between the WCD adding the sector and the WCD dropping the sector from its active set. These individual durations may then be averaged over time to determine an average duration. Further, in one exemplary embodiment, a sector in which a mobile station has an average duration of less than 120 seconds may be deemed to be a high mobility sector. However, the threshold under which a sector is considered to be a high mobility sector may be selected as a matter of engineering design choice, without departing from the scope of the invention.

In exemplary embodiments, the coverage-area mobility indicator for a given coverage area may also take on various forms. For instance, the coverage-area mobility indicator may indicate a rate at which WCDs have handed off from a given coverage area to another coverage area. In particular, the coverage-area mobility indicator may be equal to or may be based upon the total number of handoffs from the last-known coverage area during a predetermined period divided by the predetermined period. Alternatively, the coverage-area mobility indicator may be a rate-of-movement indicator that provides a speed or acceleration-related indication that is characteristic of WCDs operating in the coverage area. And as another alternative, the coverage-area mobility indicator may indicate or be based upon an average duration for which WCDs are located in a sector before being handed off to another sector. In either case, it is further possible that the coverage-area mobility indicator may be normalized to indicate the number of handoffs per predetermined period and per WCD. Further, the coverage-area mobility indicator may take a form that differs from those that are specifically described herein, without departing from the scope of the invention.

FIG. 2B is another flow chart illustrating a method 250 according to an exemplary embodiment. Method 250 illustrates an embodiment in which the RAN actively determines the mobility indicators. Further, method 250 illustrates how the RAN may resort to zone-based paging, in the event that a rapid page attempt is unsuccessful.

More specifically, method 250 involves a RAN determining that a WCD should be paged, as shown in block 252. When the RAN determines that the WCD should be paged, the RAN responsively determines the last-known coverage area of the WCD, as shown by block 254. The RAN may also determine a WCD mobility indicator of the particular WCD, as shown by block 256, and a coverage-area mobility indicator of the last-known coverage area, as shown by block 258. Then, based on both (i) the WCD mobility indicator and (ii) the coverage-area mobility indicator, the RAN determines an overall mobility indicator, as shown by block 260. This overall mobility indicator may then be used as a basis for determining whether or not to make a rapid page attempt to the WCD, as shown by block 262. If the RAN determines that it should make a rapid page attempt, then it makes the rapid page attempt in the last-known sector, as shown by block 264. Otherwise, the RAN proceeds to use a zone-based paging scheme to page the WCD, as shown by block 266.

Furthermore, the RAN may determine if a rapid page attempt is successful, as shown by block 268. The RAN may consider a rapid page attempt to have succeeded when it receives an acknowledgement message from the WCD and/or when it has successfully set up network resources for the WCD. On the other hand, if no acknowledgement is received from the WCD within a predetermined period of time, the RAN may deem the rapid page attempt to have failed. When the rapid page attempt fails, the RAN may then initiate paging using a zone-based paging scheme, as again shown by block 266.

A WCD mobility indicator may be determined using various different techniques. In some embodiments, the RAN may use historical handoff data for a given WCD to determine a handoff-likelihood indicator for that WCD. For example, a RAN (e.g., one or more RAN components) may maintain historical handoff records in a mobility database, and determine from these records a handoff rate for the given WCD. As a specific example, the RAN may query a historical handoff database in order to determining the total number of times that a given WCD has been handed off during a certain period of time. For example, the RAN may determine that a given WCD has been handed off six times during a certain period of time. This total number may itself serve as the handoff-likelihood indicator for a given WCD. In the preceding example, this means that the determined handoff-likelihood indicator for the given WCD may be equal to six.

However, the RAN may also normalize the WCD mobility indicator over time. For example, the RAN may divide the total number of handoffs of the WCD by the predetermined period of time during which the handoffs occurred. Continuing the above example, if the six handoffs occurred during a sixty minute period, the RAN may determine that the handoff-likelihood indicator for the given WCD is equal to 0.1 handoffs per minute (handoffs/min). Further, it should be understood that the RAN may use techniques other than those that are specifically described herein, without departing from the scope of the invention.

Similar techniques may also be applied in embodiments where the WCD mobility indicator takes other forms. For example, the RAN may maintain data that indicates each time that a WCD registers in a coverage area, and each time that a WCD is handed off. The RAN may determine the duration that the WCD stays in a given sector by accessing this data and determining the time between registration in the sector and the subsequent handoff to another sector. The RAN may repeat this calculation for a number of sectors (and possibly multiple times in a given sector) and then average the results to determine an average duration for the WCD. Alternatively, the RAN may average the results for the WCD from each sector, in order to determine a per-sector average duration for the WCD.

As another example, the RAN may determine a rate-of-movement indicator by from time to time measuring or receiving an indication from a given WCD of the WCD's speed. The RAN may then store the indication, possibly with an indication of the coverage area where the speed was measured. The RAN can then determine the average speed of the WCD, and in some embodiments, may determine the average speed of the WCD in a specific sector.

In a further aspect, the coverage-area mobility indicator of the last-known coverage area may be determined using various different techniques. In some embodiments, the RAN may use historical handoff data for the last-known coverage area as a basis to determine a handoff-likelihood indicator for the last-known coverage area. For instance, determining a handoff-likelihood indicator for the last-known coverage area may involve determining a rate at which WCDs have handed off from the last-known coverage area to another coverage area.

As a specific example, the RAN may determine that, during the last sixty minutes, there have been 120 handoffs from the last-known coverage area to another coverage area. (Note that this total is typically based on handoffs involving any and all WCDs, although it is also possible that a subset of WCDs may be used as a representative sample.) Accordingly, the RAN may determine that the rate of handoffs for the last-known coverage area is equal to 2.0 handoffs/min. The RAN may then set the handoff-likelihood indicator for the last-known coverage area equal to 2.0 handoffs/min, or may use this rate as a basis for determining the handoff-likelihood indicator.

In a further aspect, the coverage-area mobility indicator may further be normalized to account for the number of WCDs that operate in the given coverage area. For example, the RAN may determine the average number of WCDs that are simultaneously operating in the coverage area during at a given point during the predetermined period. Continuing the above specific example, if there is an average of 20 WCDs operating in the coverage area at any given point in time during the predetermined period, the RAN may determine that the rate of handoffs per WCD for the coverage area is equal to 0.1 handoffs per minute per WCD.

In other embodiments, the RAN may determine the coverage-area mobility indicator of the last-known coverage area by determining an average duration for which WCDs are continuously located in the last-known coverage area. For example, when a handoff of a given WCD occurs, the RAN may use CDRs and/or other records for the given WCD to determine when the WCD entered the coverage area (e.g., when the WCD registered in the coverage area). The RAN may then determine how much time elapsed between when the WCD registered in the coverage area and when the handoff of the WCD occurred. The RAN may repeat this process for a number of WCDs, and then average the respectively determined elapsed times in order to determine the average duration for which WCDs are continuously located in the coverage area. The average duration may be determined across all WCDs that are handed off from the given coverage are, or a representative subset of the WCDs that are handed off. Furthermore, the average duration may be cumulative and continually updated as WCDs are handed off, are may take the form of a moving average over a predetermined period of time. Yet further, it should be understood that the RAN may determine the coverage-area mobility indicator using techniques other than those that are specifically described herein, without departing from the scope of the invention.

And in other embodiments, the RAN may determine the coverage-area mobility indicator of the last-known coverage area by determining an average rate-of-movement for WCDs in the last-known coverage area. The average speed may be determined by using the techniques described herein with regard to individual WCDs, and averaging the results. Further, any other technique for determining speed may be used, without departing from the scope of the invention.

In exemplary embodiments, various techniques may be used to determine the overall mobility indicator. In some embodiments, for instance, the RAN may average the WCD mobility indicator of the particular WCD and the coverage-area mobility indicator. For instance, the RAN may measure both the WCD mobility and the coverage-area mobility in handoffs per minute. Accordingly, if the WCD mobility indicator for a WCD is determined to be 0.2 handoffs/min, and the coverage-area mobility indicator for the last-known coverage area of the WCD is determined to be 0.1 handoffs/min, then the overall mobility indicator may be determined to be 0.15 handoffs/min.

The overall mobility indicator may be based upon a WCD mobility indicator that is determined from the WCD's behavior in all sectors or a subset of sectors that a WCD operates in. However, the overall mobility indicator may also be based upon a WCD mobility indicator that is specific to the WCD's behavior in the last-known coverage area. For instance, in the above example, the WCD mobility indicator of 0.2 handoffs/min may indicate either that the particular WCD handed off at a rate of 0.2 handoffs/min when located in the last-known coverage area. The particular methodology for determining the WCD mobility indicator may be varied as a matter of engineering design choice.

In some embodiments, the overall mobility indicator may alternatively be determined by totaling the WCD mobility indicator of the particular WCD and the coverage-area mobility indicator. For instance, if the WCD mobility indicator for a WCD is determined to be 0.2 handoffs/min, and the coverage-area mobility indicator for the last-known coverage area of the WCD is determined to be 0.1 handoffs/min, then the overall mobility indicator may be determined to be 0.3.

The above-described techniques for using the WCD mobility indicator and the coverage-area mobility indicator to determine the overall mobility indicator should not be construed as limiting, as it possible that variations and alternative techniques to the above may be employed, without departing from the scope of the invention. Further, it should be understood that the determination of the overall mobility indicator may also involve averaging, totaling, or otherwise utilizing the WCD mobility indicator and the coverage-area mobility indicator, in embodiments where the WCD mobility indicators and the coverage-area mobility indicator take the form of rate-of-movement indicators or the average durations of stays in a given coverage area.

Once the overall mobility indicator is determined, various techniques may be used to determine whether or not to make a rapid page attempt. For instance, the RAN may determine whether or not the overall mobility indicator is below a threshold value. Then, if the overall mobility indicator is below the threshold value, the RAN may proceed to make a rapid page attempt. The threshold value may be selected as a matter of engineering design choice.

Figure 3:
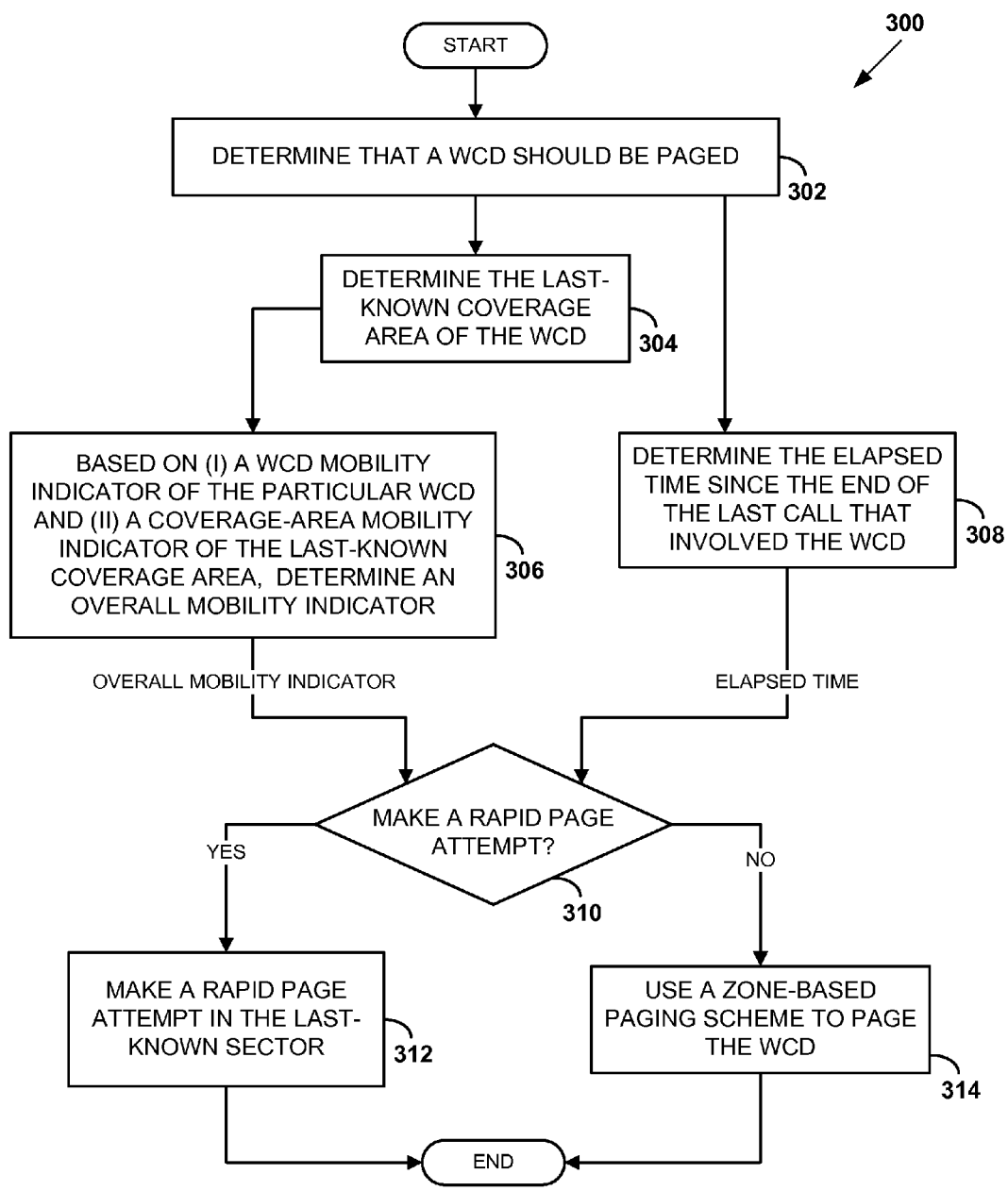
FIG. 3 is another flow chart illustrating a method according to an exemplary embodiment.

FIG. 3 is another flow chart illustrating a method 300 according to an exemplary embodiment. Method 300 is an exemplary embodiment in which the RAN uses an elapsed time since a WCD's last call ended, in addition to the overall mobility indicator, in order to determine whether or not to make a rapid page attempt.

More specifically, method 300 initially involves the RAN determining that a WCD should be paged, as shown by block 302. In response, the RAN determines the last-known coverage area of the WCD, as shown by block 304. Based on (i) a WCD mobility indicator of the particular WCD and (ii) a coverage-area mobility indicator of the last-known coverage area, the RAN then determines an overall mobility indicator, as shown by block 306. The RAN also determines the elapsed time since the end of the last call that involved the WCD, as shown by block 308. Then, based on (i) the overall mobility indicator and (ii) an elapsed time since a last call of a WCD ended, the RAN determines whether or not to make a rapid page attempt to the WCD, as shown by block 310. If the RAN determines that it should make a rapid page attempt, then it makes the rapid page attempt in the last-known sector, as shown by block 312. Otherwise, the RAN proceeds to use a zone-based paging scheme to page the WCD, as shown by block 314.

In some embodiments, the RAN may further use the overall mobility indicator to determine a threshold period of time against which it can compare the elapsed time since the WCD's last call. Generally, the greater the level of mobility indicated by the overall mobility indicator, the shorter the threshold period. Alternatively the threshold period may be a predetermined period of time. In either case, if the elapsed time is less than the determined threshold period, then the RAN makes a rapid page attempt in the sector where the last call ended. Otherwise, the RAN may resort to zone-based paging. Techniques for determining an elapsed time and comparing the elapsed time to the threshold period are described in detail in co-owned U.S. application Ser. No. 13/053,145, which is incorporated by reference herein in its entirety.

In an alternative embodiment, the RAN may sequentially use the overall mobility indicator and the elapsed time to determine whether or not to make a rapid page attempt. More specifically, the RAN may first determine whether the overall mobility indicator is above a threshold. Then, only if the overall mobility indicator is above the threshold, does the RAN proceed to determine the elapsed time and/or compare the elapsed time to a threshold period to determine whether to make a rapid page attempt. Further, the order in which the overall mobility indicator and the elapsed time are evaluated may be reversed. In particular, the RAN may first determine whether the elapsed time is less than the threshold period of time. Then, only if the elapsed time is less than the threshold period, does the RAN proceed to determine the overall mobility indicator and/or use the overall mobility indicator as a basis to determine whether to send a rapid page.

Figure 4:
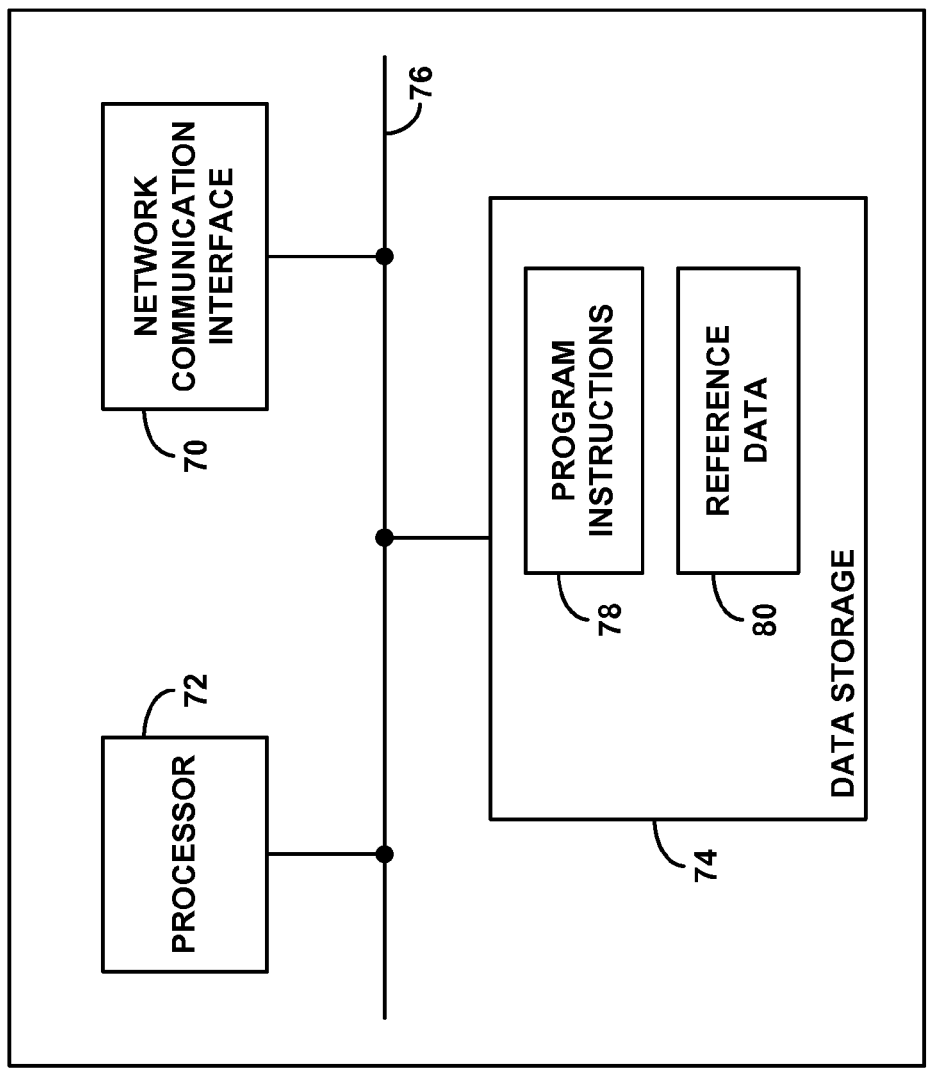
FIG. 4 is a simplified block diagram of a network entity arranged to carry out functions of an exemplary method.

FIG. 4 is next a simplified block diagram of a network entity arranged to carry out functions of the present method. As shown, the network entity includes a network communication interface 70, a processor 72, and data storage 74, all of which may be communicatively linked together by a system bus, network, or other connection mechanism 76.

Communication interface 70 functions to facilitate communication between the network entity and one or more other entities, such as air interface communication with served subscriber devices and/or backhaul communication with other network entities. The communication interface may thus provide for wired and/or wireless communication and may take any of a variety of forms.

Processor 72 may comprise one or more general purpose processors (e.g., INTEL microprocessors) and/or one or more special purpose processors (e.g., application specific integrated circuits) and may integrated in whole or in part with communication interface 70. Data storage 74, in turn, comprises one or more volatile and/or non-volatile storage components, such as magnetic, optical, flash, or organic storage components, and may be integrated in whole or in part with processor 72. Data storage 74 preferably contains program instructions 78 executable by the processor 72 to carry out various functions described herein. Further, data storage 74 may contain reference data 80, such as the correlation data described above for instance, to facilitate implementation of the method in practice.

It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor or processors executing program instructions stored in memory or another machine-readable medium (i.e., data storage, rather than a mere signal), to achieve the useful, concrete, and tangible result of determining whether or not to make a rapid page attempt.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
    at a radio access network, determining that a wireless communication device (WCD) should be paged;
    responsive to determining that the WCD should be paged:
        determining a last-known coverage area of the WCD;
        based at least in part on (i) a WCD mobility indicator of the WCD and (ii) a coverage-area mobility indicator of the last-known coverage area, determining an overall mobility indicator; and
        using the overall mobility indicator as a basis for determining whether or not to make a rapid page attempt to the WCD;
    if it is determined to make the rapid page attempt, then making the rapid page attempt in the last-known sector; and
    otherwise, using a zone-based paging scheme to page the WCD.

2. The method of claim 1, wherein the last-known coverage area comprises a sector of the radio access network in which a last call of the WCD ended.

3. The method of claim 1, wherein the last-known coverage area comprises a coverage area of the radio access network in which the WCD last registered.

4. The method of claim 1, further comprising determining the WCD mobility indicator.

5. The method of claim 4, wherein determining the WCD mobility indicator comprises using historical handoff data for the WCD to determine a handoff-likelihood indicator for the WCD.

6. The method of claim 4, wherein determining the WCD mobility indicator comprises determining a rate-of-movement indicator of the WCD.

7. The method of claim 1, further comprising determining the coverage-area mobility indicator of the last-known coverage area.

8. The method of claim 6, wherein determining the coverage-area mobility indicator of the last-known coverage area comprises using historical handoff data for the last-known coverage area as a basis for determining a handoff-likelihood indicator for the last-known coverage area.

9. The method of claim 7, wherein determining the handoff-likelihood indicator for the last-known coverage area comprises determining a rate at which WCDs have handed off from the last-known coverage area to another coverage area.

10. The method of claim 6, wherein determining the coverage-area mobility indicator of the last-known coverage area comprises determining an average duration for which WCDs are continuously located in the last-known coverage area.

11. The method of claim 1, wherein determining an overall mobility indicator comprises applying an averaging function to the WCD mobility indicator and the coverage-area mobility indicator.

12. The method of claim 1, wherein determining an overall mobility indicator comprises applying a cumulating function to the WCD mobility indicator and the coverage-area mobility indicator.

13. The method of claim 1, wherein using the overall mobility indicator as a basis for determining whether or not to make the rapid page attempt to the WCD comprises:
    determining whether or not the overall mobility indicator is below a threshold value;
    if the overall mobility indicator is below the threshold value, then determining to make a rapid page attempt; and
    otherwise determining not to make a rapid page attempt.

14. A method comprising:
    at a radio access network, determining that a wireless communication device (WCD) should be paged;
    responsive to determining that the WCD should be paged:
        determining a last-known coverage area of the WCD;
        based at least in part on (i) a WCD mobility indicator of the WCD and (ii) a coverage-area mobility indicator of the last-known coverage area, determining an overall mobility indicator; and
        based at least in part on (i) the overall mobility indicator and (ii) an elapsed time since a last call of a WCD ended, determining whether or not to make a rapid page attempt to the WCD;
    if it is determined to make the rapid page attempt, then making the rapid page attempt in the last-known sector; and
    otherwise, using a zone-based paging scheme to page the WCD.

15. The method of claim 14, wherein determining whether or not to make the rapid page attempt comprises:
    using the overall mobility indicator to determine a threshold period of time; and
    if the elapsed time since the last call of the WCD ended is less than the threshold period of time, then determining to make the rapid page attempt.

16. A radio-access-network system comprising:
    a non-transitory computer-readable medium;

program instructions stored in the non-transitory computer-readable medium and executable by at least one processor to:
  determine that a radio access network should page a wireless communication device (WCD);
  determine a last-known coverage area of the WCD;
  based at least in part on (i) a WCD mobility indicator of the WCD and (ii) a coverage-area mobility indicator of the last-known coverage area, determine an overall mobility indicator;
  use the overall mobility indicator as a basis for determining whether or not to make a rapid page attempt to the WCD;
  if it is determined to make the rapid page attempt, then initiate the rapid page attempt in the last-known sector; and
otherwise, cause a zone-based paging scheme to implemented in order to page the WCD.

17. The system of claim 16, further comprising program instructions stored in the non-transitory computer-readable medium and executable by at least one processor to determine the WCD mobility indicator.

18. The system of claim 16, further comprising program instructions stored in the non-transitory computer-readable medium and executable by at least one processor to determine the coverage-area mobility indicator of the last-known coverage area.

19. The system of claim 16, wherein the program instructions stored in the non-transitory computer-readable medium and executable by at least one processor to determine the overall mobility indicator comprise program instructions stored in the non-transitory computer-readable medium and executable by at least one processor to:
  apply an averaging function to the WCD mobility indicator and the coverage-area mobility indicator.

20. The system of claim 16, wherein the program instructions stored in the non-transitory computer-readable medium and executable by at least one processor to determine the overall mobility indicator comprise program instructions stored in the non-transitory computer-readable medium and executable by at least one processor to:
  apply a cumulating function to the WCD mobility indicator and the coverage-area mobility indicator.

* * * * *